US011254185B2

(12) United States Patent
Shibuya et al.

(10) Patent No.: US 11,254,185 B2
(45) Date of Patent: Feb. 22, 2022

(54) AIR-CONDITIONING CONTROL SYSTEM FOR VEHICLE, AIR-CONDITIONING CONTROL METHOD FOR VEHICLE, AND RECORDING MEDIUM

(71) Applicant: HONDA MOTOR CO., LTD., Tokyo (JP)

(72) Inventors: Miki Shibuya, Wako (JP); Mamoru Fujita, Wako (JP); Junichi Kanemaru, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 16/695,370

(22) Filed: Nov. 26, 2019

(65) Prior Publication Data

US 2020/0189353 A1    Jun. 18, 2020

(30) Foreign Application Priority Data

Dec. 12, 2018    (JP) .............................. JP2018-232529

(51) Int. Cl.
    *B60H 1/00* (2006.01)
(52) U.S. Cl.
    CPC ....... *B60H 1/00742* (2013.01); *B60H 1/0075* (2013.01); *B60H 1/00878* (2013.01)
(58) Field of Classification Search
    CPC .............. B60H 1/00742; B60H 1/0075; B60H 1/00878; B60H 1/00385; B60H 1/00892; B60H 1/00807
    See application file for complete search history.

(56) References Cited

U.S. PATENT DOCUMENTS 5,172,856 A * 12/1992 Tanaka ............... G06K 9/00845
                                                  236/49.3
5,187,943 A *  2/1993 Taniguchi .......... B60H 1/00742
                                                  62/180

(Continued)

FOREIGN PATENT DOCUMENTS

JP          57-003019          1/1982
JP          06-239128          8/1994
                    (Continued)

OTHER PUBLICATIONS

Japanese Office Action for Japanese Patent Application No. 2018-232529 dated Oct. 5, 2021.

*Primary Examiner* — Ljiljana V. Ciric
(74) *Attorney, Agent, or Firm* — Amin, Turocy & Watson, LLP

(57) ABSTRACT

An air-conditioning control system for a vehicle includes an acquisitor configured to acquire an exposure temperature of an exposed body surface of an occupant and a clothing surface temperature of the occupant, a non-exposure temperature estimator configured to estimate a non-exposure temperature of a non-exposed body surface of the occupant on the basis of the exposure temperature and a clothing amount, a clothing amount estimator configured to estimate the clothing amount on the basis of the non-exposure temperature and the clothing surface temperature, and a control unit configured to control an air conditioner of a vehicle into which the occupant gets on the basis of an estimation result of the clothing amount estimator.

8 Claims, 9 Drawing Sheets

(56) References Cited

U.S. PATENT DOCUMENTS

| | | | | |
|---|---|---|---|---|
| 5,518,176 | A * | 5/1996 | Turner | B60H 1/00742 236/49.3 |
| 6,021,956 | A * | 2/2000 | Haraguchi | B60H 1/00742 236/51 |
| 6,659,358 | B2 * | 12/2003 | Kamiya | B60H 1/00792 165/204 |
| 7,918,100 | B2 * | 4/2011 | Breed | F24F 11/30 62/244 |
| 8,280,584 | B2 * | 10/2012 | Mikat | B62D 1/065 701/36 |
| 10,227,063 | B2 * | 3/2019 | Abreu | B60H 1/00742 |
| 10,272,920 | B2 * | 4/2019 | Shikii | B60W 50/14 |
| 10,486,491 | B2 * | 11/2019 | Yoneda | B60H 1/00742 |
| 2001/0039806 | A1 * | 11/2001 | Kawai | B60H 1/00792 62/229 |
| 2005/0267646 | A1 * | 12/2005 | Ichishi | G05D 23/1928 700/300 |
| 2009/0031741 | A1 * | 2/2009 | Hara | B60H 1/00735 62/239 |
| 2015/0105976 | A1 * | 4/2015 | Shikii | B60H 1/00742 701/36 |
| 2016/0116178 | A1 * | 4/2016 | Vega | G05B 13/02 700/276 |
| 2016/0123617 | A1 * | 5/2016 | Vega | F24F 11/30 706/12 |
| 2016/0363340 | A1 * | 12/2016 | Shikii | F24F 11/30 |
| 2017/0282684 | A1 | 10/2017 | Fearns et al. | |
| 2017/0341485 | A1 * | 11/2017 | Yoneda | A61B 5/0077 |
| 2017/0368907 | A1 * | 12/2017 | Yoneda | G06K 9/00845 |
| 2018/0001734 | A1 * | 1/2018 | Faust | B60H 1/00871 |
| 2018/0126821 | A1 * | 5/2018 | Moench | H05B 1/00 |
| 2018/0251007 | A1 * | 9/2018 | Neveu | B60H 1/2225 |
| 2018/0345753 | A1 * | 12/2018 | Beloe | B60H 1/00964 |
| 2019/0009639 | A1 * | 1/2019 | Ito | B60H 1/00828 |
| 2019/0248208 | A1 * | 8/2019 | Higashitani | B60W 10/04 |
| 2019/0375271 | A1 * | 12/2019 | Neveu | G06K 9/2018 |
| 2019/0381865 | A1 * | 12/2019 | Oshikiri | B60H 1/0075 |
| 2020/0143180 | A1 * | 5/2020 | Burzo | G06K 9/00892 |
| 2020/0189352 | A1 * | 6/2020 | Han | G01J 5/12 |
| 2020/0331320 | A1 * | 10/2020 | Saeki | B60H 1/00971 |
| 2021/0291619 | A1 * | 9/2021 | Aghniaey | B60W 10/30 |

FOREIGN PATENT DOCUMENTS

| | | |
|---|---|---|
| JP | 2002-127728 | 5/2002 |
| JP | 2005-306196 | 11/2005 |
| JP | 5300602 | 9/2013 |
| JP | 2017-032268 | 2/2017 |
| WO | WO 2017/065797 A1 * | 4/2017 |

* cited by examiner

| Rcl | THIN CLOTHING | STANDARD | THICK CLOTHING |
|---|---|---|---|
| A | ○ | ● | ◎ |
| B | + | ✖ | ⊠ |
| C | △ | ▲ | ▽ |

AIR-CONDITIONING CONTROL SYSTEM FOR VEHICLE, AIR-CONDITIONING CONTROL METHOD FOR VEHICLE, AND RECORDING MEDIUM

CROSS-REFERENCE TO RELATED APPLICATION

Priority is claimed on Japanese Patent Application No. 2018-232529, filed Dec. 12, 2018, the content of which is incorporated herein by reference.

BACKGROUND

Field of the Invention

The present invention relates to an air-conditioning control system for a vehicle, an air-conditioning control method for a vehicle, and a recording medium.

Description of Related Art

In the related art, a technology of performing air-conditioning control on the basis of thermal sensation estimated from a detection result of a surface temperature of an occupant clothing part is known (for example, see Japanese Unexamined Patent Application, First Publication No. 2002-127728). In the related art, a technology of estimating warm-cold sense of an occupant and performing air-conditioning control by estimating a metabolic rate or a clothing amount of the occupant on the basis of results detected by an infrared sensor is known (for example, see Japanese Unexamined Patent Application, First Publication No. 2017-32268, and Japanese Patent No. 5300602).

SUMMARY

However, in the related art, an occupant's warm-cold sense differing depending on a clothing amount is not considered, the warm-cold sense felt by the occupant in actuality may not be estimated sufficiently, and there is a possibility that comfort for the occupant may not be able to be enhanced.

In consideration of the above-mentioned circumstances, an aspect of the present invention is directed to providing an air-conditioning control system for a vehicle, an air-conditioning control method for a vehicle, and a recording medium that are capable of enhancing comfort for an occupant.

An air-conditioning control system for a vehicle, an air-conditioning control method for a vehicle, and a recording medium according to the present invention employ the following configurations.

(1): An air-conditioning control system for a vehicle according to an aspect of the present invention includes an acquisitor configured to acquire an exposure temperature of an exposed body surface of an occupant and a clothing surface temperature of the occupant; a non-exposure temperature estimator configured to estimate a non-exposure temperature of a non-exposed body surface of the occupant on the basis of the exposure temperature and a clothing amount; a clothing amount estimator configured to estimate the clothing amount on the basis of the non-exposure temperature and the clothing surface temperature; and a control unit configured to control an air conditioner of a vehicle into which the occupant gets on the basis of an estimation result of the clothing amount estimator.

(2): In the aspect of the above-mentioned (1), the non-exposure temperature estimator estimates the non-exposure temperature on the basis of the clothing amount estimated by the clothing amount estimator.

(3): In the aspect of the above-mentioned (2), the non-exposure temperature estimator estimates the non-exposure temperature on the basis of the clothing amount, which is previously set, in processing of a first routine, and estimates the non-exposure temperature on the basis of the clothing amount estimated by the clothing amount estimator after processing of the first routine, and the clothing amount estimator estimates a clothing amount of the occupant on the basis of a non-exposure temperature estimated by the non-exposure temperature estimator and the clothing surface temperature.

(4): In the aspect of the above-mentioned (1), the air-conditioning control system for a vehicle includes a heat radiation amount estimator configured to estimate a heat radiation amount of the occupant on the basis of the non-exposure temperature, a core temperature of the occupant, and a skin heat resistance, wherein the clothing amount estimator estimates the clothing amount on the basis of the heat radiation amount estimated by the heat radiation amount estimator, the non-exposure temperature, and the clothing surface temperature.

(5): In the aspect of the above-mentioned (1), the control unit sets a target clothing surface temperature, which is a target, on the basis of the clothing amount estimated by the clothing amount estimator, and sets a temperature in a target passenger compartment and controls the air conditioner such that the clothing surface temperature approaches the target clothing surface temperature that is set.

(6): In the aspect of the above-mentioned (5), the air-conditioning control system for a vehicle further includes a correction unit configured to correct the target clothing surface temperature or information for deriving the target clothing surface temperature on the basis of a temperature difference between the target clothing surface temperature and the clothing surface temperature in a case that the temperature difference is equal to or larger than a threshold value.

(7): An air-conditioning control method for a vehicle according to an aspect of the present invention is performed by a computer and includes: acquiring an exposure temperature of an exposed body surface of an occupant and a clothing surface temperature of the occupant; estimating a non-exposure temperature of a non-exposed body surface of the occupant on the basis of the exposure temperature and a clothing amount; estimating the clothing amount on the basis of the non-exposure temperature and the clothing surface temperature; and controlling an air conditioner of a vehicle into which the occupant gets on the basis of an estimation result of the clothing amount.

(8): A non-transitory computer-readable recording medium recording a vehicle control program causing an in-vehicle computer and a program is stored therein, the program causing the computer to: acquire an exposure temperature of an exposed body surface of an occupant and a clothing surface temperature of the occupant; estimate a non-exposure temperature of a non-exposed body surface of the occupant on the basis of the exposure temperature and a clothing amount; estimate the clothing amount on the basis of the non-exposure temperature and the clothing surface temperature; and control an air conditioner of a vehicle into which the occupant gets on the basis of an estimation result of the clothing amount.

According to the aspects of the above-mentioned (1) to (8), it is possible to improve comfort according to a state of an occupant.

According to the aspects of the above-mentioned (3) and (4), it is possible to increase estimation accuracy of a clothing amount of an occupant.

DESCRIPTION OF EMBODIMENTS

Hereinafter, embodiments of an air-conditioning control system for a vehicle, an air-conditioning control method for a vehicle, and a recording medium of the present invention will be described with reference to the accompanying drawings.

[Entire Configuration]

A configuration of an air-conditioning control system 1 for a vehicle according to an embodiment of the present invention will be described. In the following description, while a vehicle 10 on which an air-conditioning control device 100 that embodies the air-conditioning control system 1 for a vehicle is mounted is an electric automobile, the vehicle 10 may be a vehicle on which an internal combustion engine such as a diesel engine, a gasoline engine, or the like, is mounted. The vehicle 10 may be a vehicle such as a hybrid vehicle or the like, on which an internal combustion engine, a driving motor driven by electric power for traveling and a secondary battery, in which electric power supplied to the driving motor is accumulated, are mounted, or a vehicle on which a fuel cell configured to supply electric power for traveling to a driving motor is mounted.

Figure 1:
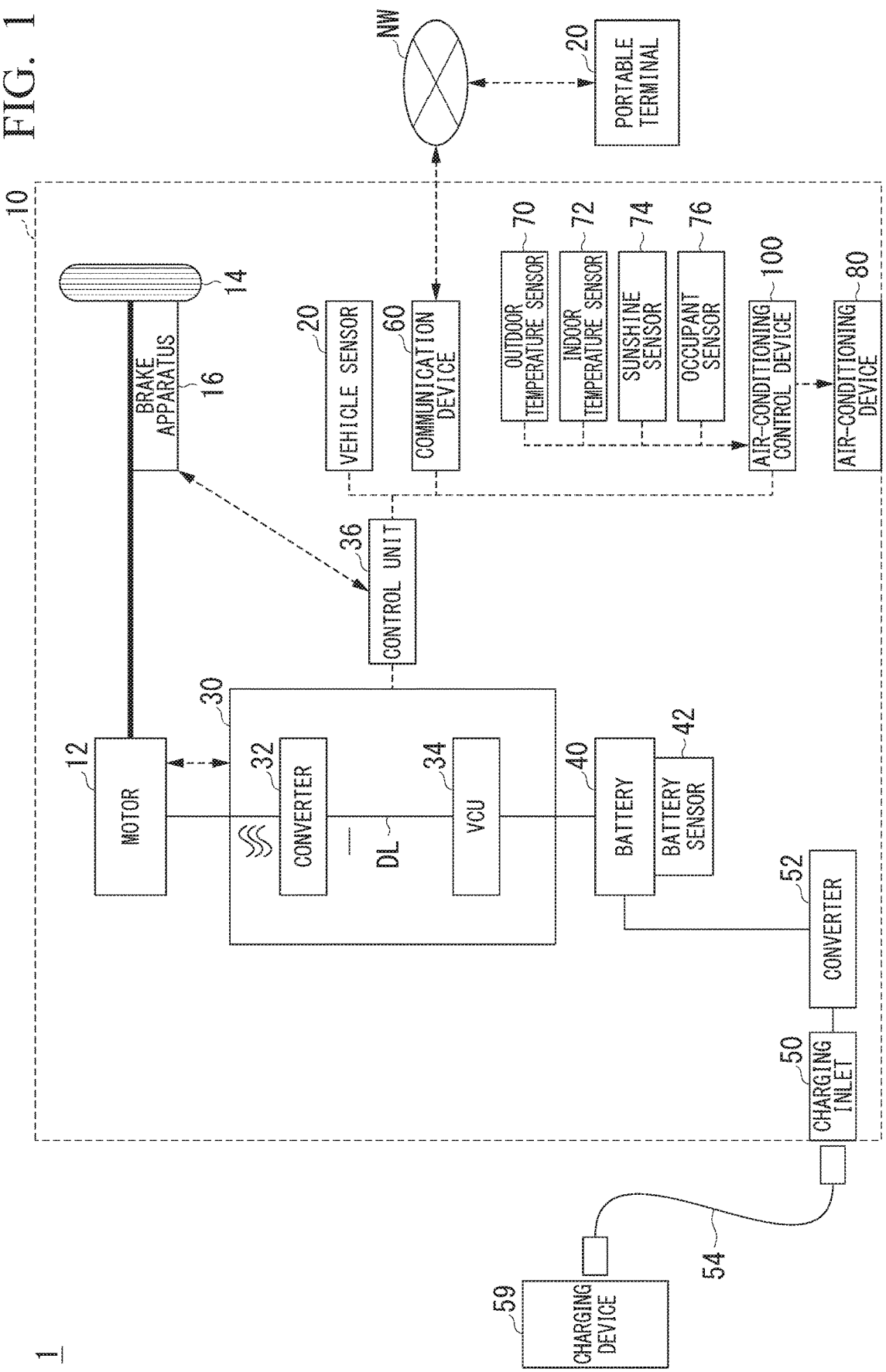
FIG. 1 is a view showing an example of a configuration of an air-conditioning control system for a vehicle.

FIG. 1 is a view showing an example of a configuration of the air-conditioning control system 1 for a vehicle. The air-conditioning control system 1 for a vehicle includes, for example, the vehicle 10 and a terminal device 500. The vehicle 10 and the terminal device 500 are connected in a state in which transmission and reception of data can be performed through a network NW such as the Internet, a wide area network (WAN), a local area network (LAN), or the like. The terminal device 500 is, for example, a cellular phone or a smartphone used by an occupant in the vehicle 10. For example, the terminal device 500 receives air-conditioning settings from the occupant in the vehicle 10 and transmits information to the air-conditioning control device 100 on the basis of the received control settings. In this case, the air-conditioning control device 100 controls an air conditioning device 80 on the basis of the control settings transmitted from the terminal device 500.

The vehicle 10 includes, for example, a motor 12, a driving wheel 14, a brake apparatus 16, a vehicle sensor 20, a power control unit (PCU) 30, a battery (a secondary battery) 40, a battery sensor 42, a charging inlet 50, a converter 52, a communication device 60, an outdoor temperature sensor 70, an indoor temperature sensor 72, a sunshine sensor 74, an occupant sensor 76, the air conditioning device 80, and the air-conditioning control device 100. These devices and instruments are connected to each other by a multiple communication line such as a controller area network (CAN) communication line or the like, a serial communication line, a wireless communication network, or the like. The configuration shown in FIG. 1 is merely an example, a part of the configuration may be omitted, and other constituents may be further added thereto.

The motor 12 is, for example, a three-phase alternating current motor. A rotor of the motor 12 is connected to the driving wheel 14. The motor 12 outputs power to the driving wheel 14 using the supplied electric power. The motor 12 generates power using kinetic energy of the vehicle 10 during deceleration of the vehicle 10.

The brake apparatus 16 includes, for example, a brake caliper, a cylinder configured to transmit a hydraulic pressure to the brake caliper, and an electric motor configured to generate a hydraulic pressure in the cylinder. The brake apparatus 16 may include a mechanism configured to transmit the hydraulic pressure generated by the operation of the brake pedal to the cylinder via the master cylinder as a back-up. The brake apparatus 16 is not limited to the above-mentioned configuration, and may be an electronically controlled hydraulic brake apparatus configured to transmit a hydraulic pressure in the master cylinder to the cylinder.

The vehicle sensor 20 includes an accelerator position sensor, a vehicle speed sensor and a brake stepping sensor. The accelerator position sensor is attached to an accelerator pedal that is an example of an operator configured to receive an acceleration order of a driver, detect an operation amount of the accelerator pedal, and output the detected operation amount to a vehicle control unit 36 as an accelerator position. The vehicle speed sensor includes, for example, wheel speed sensors and speed calculators attached to wheels, derives a speed of the vehicle (a vehicle speed) by integrating wheel speeds detected by the wheel speed sensors, and outputs the derived vehicle speed to the vehicle control unit 36. The brake stepping sensor is attached to the brake pedal, detects an operation amount of the brake pedal, and outputs the detected operation amount to the vehicle control unit 36 as a brake depression amount. A driver of the vehicle 10 is an example of the occupant.

The PCU 30 includes, for example, a converter 32, a voltage control unit (VCU) 34, and the vehicle control unit 36. An integrated configuration of these components as the PCU 30 is merely an example, and these components may be arranged in a distributed manner.

The converter 32 is, for example, an AC-DC converter. A direct current-side terminal of the converter 32 is connected to a direct current link DL. The battery 40 is connected to the direct current link DL via the VCU 34. The converter 32 converts alternating current generated by the motor 12 into direct current, and outputs the converted direct current to the direct current link DL. The converter 32 converts direct current supplied via the direct current link DL into alternating current, and supplies the converted alternating current to the motor 12.

The VCU 34 is, for example, a DC-DC converter. The VCU 34 boosts the electric power supplied from the battery 40, and outputs the boosted electric power to the direct current link DL. The VCU 34 increases a voltage of the direct current link DL according to an order from the vehicle control unit 36.

The vehicle control unit 36 includes, for example, a motor control unit, a brake control unit, and a battery/VCU control unit. The motor control unit, the brake control unit, and the battery/VCU control unit may be substituted with separate control devices, for example, control devices such as a motor ECU, a brake ECU and a battery ECU.

The motor control unit controls the motor 12 on the basis of the operation amount of the accelerator pedal that is a detection result of the vehicle sensor 20. The brake control unit controls the brake apparatus 16 on the basis of the operation amount of the brake pedal that is a detection result of the vehicle sensor 20. The battery/VCU control unit calculates a state of charge (SOC; a charging rate) of the battery 40 or controls the VCU 34 or the battery 40 on the basis of the output of the battery sensor 42 attached to the battery 40.

The battery 40 is, for example, a secondary battery such as a lithium ion battery or the like. The electric power introduced from an external charging device 59 of the vehicle 10 is accumulated in the battery 40. The battery 40 supplies electric power to the motor 12. The battery sensor 42 includes, for example, a current sensor, a voltage sensor, and a temperature sensor. The battery sensor 42 includes, for example, a voltage sensor, a current sensor, a temperature sensor, and the like. The voltage sensor, the current sensor and the temperature sensor detect a current value, a voltage value and a temperature of the battery 40, respectively. The battery sensor 42 outputs the detected current value, voltage value, temperature, and the like, to the vehicle control unit 36.

The charging inlet 50 is provided on an outer side of a vehicle body of the vehicle 10. The charging inlet 50 is connected to the charging device 59 via a charging cable 54.

The converter 52 is provided between the battery 40 and the charging inlet 50. The converter 52 converts current introduced from the charging device 59 via the charging inlet 50, for example, alternating current, into direct current. The converter 52 outputs the converted direct current to the battery 40.

The communication device 60 includes a wireless module configured to connect a cellular network or a Wi-Fi network. The communication device 60 communicates with the terminal device 500 via, for example, a network NW.

The outdoor temperature sensor 70 is installed at, for example, a place where there is little influence from heat of an engine, a vehicle body and a road surface (for example, in the vicinity of a front bumper), detects an outdoor temperature, and outputs the detection values to the air-conditioning control device 100, which will be described below.

For example, the indoor temperature sensor 72 may be mounted inside a lower section of an instrument panel (not shown), detects an indoor temperature, and outputs the detection values to the air-conditioning control device 100, which will be described below. Each of the outdoor temperature sensor 70 and the indoor temperature sensor 72 may be, for example, a thermistor or the like configured to detect a variation in temperature as a variation in resistance.

The sunshine sensor 74 is installed on, for example, an instrument panel, a front windshield, or the like, of the vehicle 10, detects a sunshine amount, and outputs the detection values to the air-conditioning control device 100, which will be described below.

The occupant sensor 76 acquires, for example, an exposure temperature of an exposed body surface of the occupant and a clothing surface temperature of the occupant. The exposure temperature of the exposed body surface of the occupant and the clothing surface temperature of the occupant are, for example, information for detecting the surface temperature of the exposed skin of the occupant or the clothing surface temperature of the occupant, information for estimating the surface temperatures thereof, or detection values of the surface temperatures thereof. The occupant sensor 76 is, for example, a thermography camera, or a temperature sensor or a sweating sensor attached to the occupant's body. The thermography camera is provided at a position where the occupant in the passenger compartment of the vehicle 10 can be imaged, acquires a thermograph image that represents a temperature distribution on the basis of infrared rays radiated from the occupant, and outputs the acquired thermograph image to the air-conditioning control device 100. The temperature sensor or the sweating sensor attached to the occupant's body wirelessly communicates with the vehicle 10 or a server apparatus (not shown), and transmits the detection values of the temperature sensor to the vehicle 10 or transmits the detection values to the vehicle 10 via the server apparatus. A temperature sensor or a sweating sensor provided at a place with which the occupant comes into contact in the passenger compartment, for example, a handle or the like, may detect a surface temperature or a sweating rate of the exposed skin of the occupant. In the following description, the occupant information will be described as a thermograph image.

The air conditioning device 80 includes an ECU configured to control a volume of air delivered from a heat exchanger, or blowout ports of the heat exchanger and an air conditioner, and adjusts an environment in the passenger compartment by adjusting a state of the air in the passenger compartment of the vehicle 10. An operation of the air conditioning device 80 is controlled by the air-conditioning control device 100. For example, operations of the air conditioning device 80 are controlled by the air-conditioning control device 100 as "a cooling operation," "a heating operation," "a holding operation," "an outdoor temperature holding operation" or "stopping." The holding operation is an operation of holding a temperature in the passenger compartment of the vehicle 10, and the outdoor temperature holding operation is an operation of matching the temperature in the passenger compartment of the vehicle 10 with that of external air. While the air conditioning device 80 will be described as including a heater, the heater may be provided separately from the air conditioning device 80. In the following description, an inside of the passenger compartment of the vehicle 10 is simply referred to as "an inside of the passenger compartment."

[Air-Conditioning Control Device]

Figure 2:
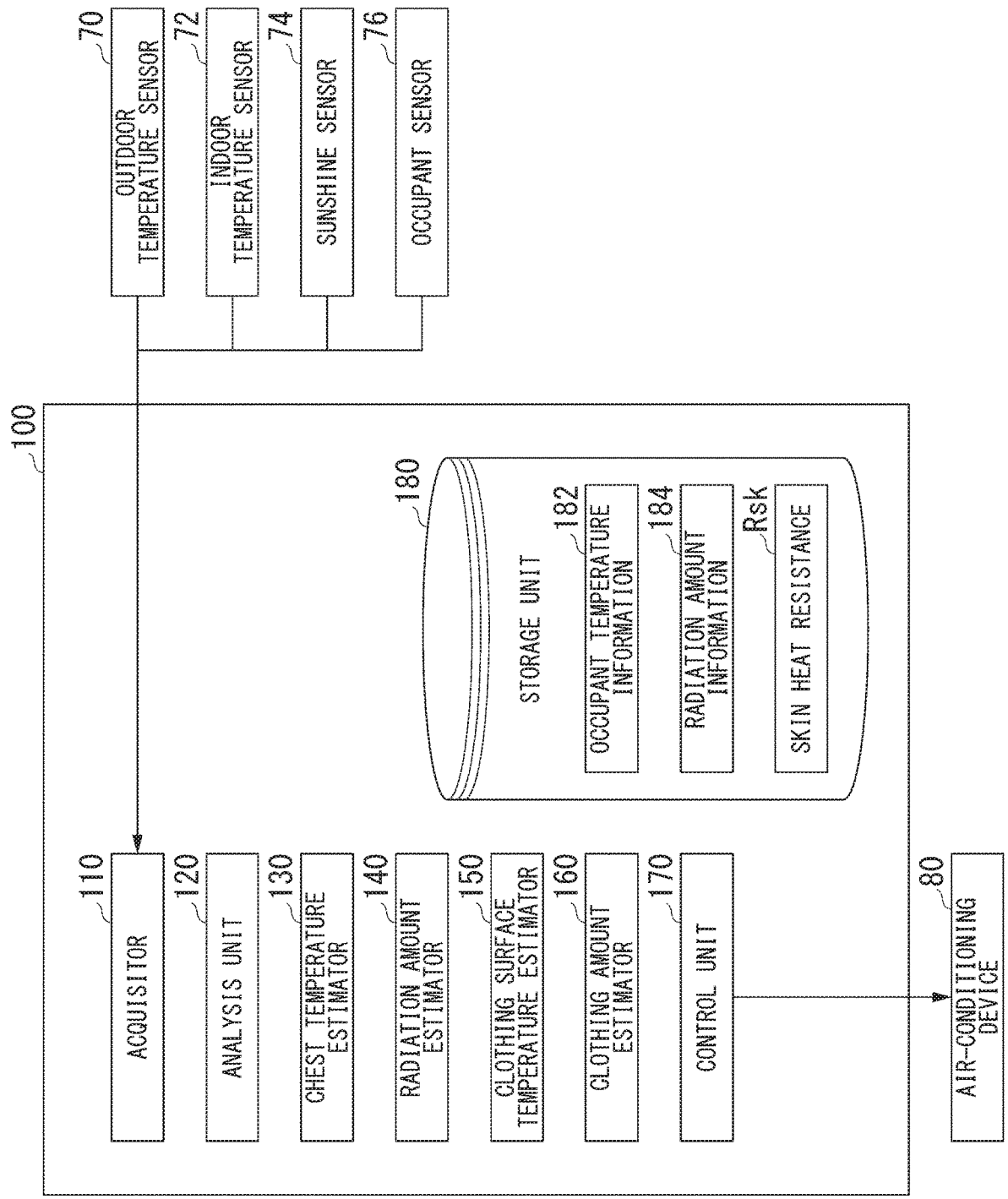
FIG. 2 is a view showing an example of a configuration of an air-conditioning control device.

FIG. 2 is a view showing an example of a configuration of the air-conditioning control device 100. The air-conditioning control device 100 includes, for example, a receiving unit 110, an analysis unit 120, a chest temperature estimator 130, a heat radiation amount estimator 140, a clothing surface temperature estimator 150, a clothing amount estimator 160, a control unit 170, and a storage unit 180.

The receiving unit 110 acquires occupant information of the occupant output from the occupant sensor 76, and information related to the vehicle. The information related to the vehicle is some or all of detection values of the outdoor temperature detected by the outdoor temperature sensor 70, a detection values of the indoor temperature detected by the indoor temperature sensor 72, and a sunshine amount detected by the sunshine sensor 74. The receiving unit 110 outputs the acquired occupant information and the information related to the vehicle to the analysis unit 120.

The analysis unit 120 analyzes the occupant information of the occupant acquired by the receiving unit 110, detects a surface temperature of the exposed skin of the occupant (for example, the face skin) and a clothing surface temperature of the occupant, and outputs these detection values to the chest temperature estimator 130. The analysis unit 120 may detect a surface temperature of the exposed skin of the occupant on the basis of the occupant information acquired by the receiving unit 110 and the information related to the vehicle. In the following description, the surface temperature of the face portion of the occupant is referred to as a face skin temperature Ts_face. A combination of functions of the receiving unit 110 and the analysis unit 120 is an example of "an acquisitor."

The analysis unit 120 may compare an image captured by a camera provided in the passenger compartment (not shown) and a template showing a feature quantity of a face prepared according to age and gender, and estimate the age and gender as those associated with the template matching the captured image as the ages and gender of the occupant on the basis of the comparison result. The analysis unit 120 may compare the image captured by the camera provided in the passenger compartment and the template showing a feature quantity of the face of the occupant who has previously been registered, and identify the occupant associated with the template matching the captured image on the basis of the comparison result. A technology of specifying the occupant may be a technology of specifying the occupant by a certification through a fingerprint or inputting a specified number or the like to an operation unit of the vehicle 10. The analysis unit 120 may analyze an image captured by the camera and specify a color (including shades of the color) of clothing of the occupant.

The chest temperature estimator 130 estimates a temperature of the skin of a portion that is not exposed, which becomes a reference for a warm-cold sense of the occupant, on the basis of the detection values (the exposure temperature) output by the analysis unit 120. The portion that is not exposed is, for example, the chest or the abdomen. In the following description, the temperature of the skin of the portion that is not exposed is referred to as a chest skin temperature Ts_chest. A method of estimating the chest skin temperature Ts_chest will be described below. The chest temperature estimator 130 outputs the estimated chest skin temperature Ts_chest to the heat radiation amount estimator 140. The chest temperature estimator 130 is an example of "a non-exposure temperature estimator."

The heat radiation amount estimator 140 estimates a heat radiation amount of the occupant (hereinafter, a heat radiation amount Q) on the basis of the chest skin temperature Ts_chest output from the chest temperature estimator 130. The radiation amount is a quantity of heat radiated from arms, legs, and the like, of the occupant into the passenger compartment. A method of estimating the heat radiation amount Q will be described below. The heat radiation amount estimator 140 outputs the estimated radiation amount Q to the clothing surface temperature estimator 150.

The clothing surface temperature estimator 150 estimates a clothing surface temperature Tcl. The clothing surface temperature estimator 150 estimates the clothing surface temperature Tcl by applying one or more parameters of, for example, a non-exposure temperature of the occupant, information related to the vehicle, an exposure temperature of the occupant, and the like, to a prescribed model. In the clothing surface temperature estimator 150, in a case that the detection values of the clothing surface temperature Tcl is output by the analysis unit 120, since the detection values is used as the clothing surface temperature Tcl, processing of estimating the clothing surface temperature Tcl may be omitted. The clothing surface temperature estimator 150 outputs the clothing surface temperature Tcl to the clothing amount estimator 160.

The clothing amount estimator 160 estimates a clothing amount of the occupant (hereinafter, a clothing amount Rcl). The clothing amount Rcl will be described below. The clothing amount estimator 160 outputs the estimated clothing amount Rcl to the chest temperature estimator 130 and the control unit 170.

The control unit 170 controls the air conditioning device 80 by setting a target of a clothing surface temperature of the occupant (hereinafter, a target clothing surface temperature Tcl_tgt) used as a control target of the air conditioning device 80 on the basis of the clothing amount Rcl output from the clothing amount estimator 160. A method of setting the target clothing surface temperature Tcl_tgt will be described below. The control unit 170 outputs the target clothing surface temperature Tcl_tgt, which is set, or a control target temperature in the passenger compartment (hereinafter, a temperature in a target passenger compartment Ta_tgt) set on the basis of the target clothing surface temperature Tcl_tgt to the air conditioning device 80.

The storage unit 180 stores, for example, an occupant temperature information 182, a heat radiation amount information 184, and a skin heat resistance Rsk.

The occupant temperature information 182 is the skin temperature of a portion that is not exposed (hereinafter, a comfortable skin temperature Tcomf), and for example, this temperature may be an interior portion temperature of a person (hereinafter, a core temperature Tcore) or a temperature at which the occupant feels comfortable. The core temperature Tcore may be a fixed value of, for example, about 37 [° C.]. The comfortable skin temperature Tcomf is a fixed value that can be set according to an occupant. The occupant temperature information 182 may include information such as sexuality, ages, preferences for air-conditioning settings, or the like, of the occupant, which is provided by the terminal device 500 or the like via a network NW.

The radiation amount information 184 is, for example, a heat radiation amount of the occupant (hereinafter, a comfortable radiation amount Qcomf) in a case that the temperature is felt as a comfortable temperature by the occupant. For example, the comfortable radiation amount Qcomf is derived according to the comfortable skin temperature Tcomf of each occupant and stored in the storage unit 180.

The skin heat resistance Rsk is, for example, the skin heat resistance Rsk according to the occupant. The skin heat resistance Rsk actively varies according to variation in rate of heat production of the occupant, outdoor temperature, or the like, derived on the basis of the comfortable skin temperature Tcomf and the comfortable radiation amount Qcomf according to the occupant, and stored in the storage unit 180.

[Processing Summary]

Figure 3:
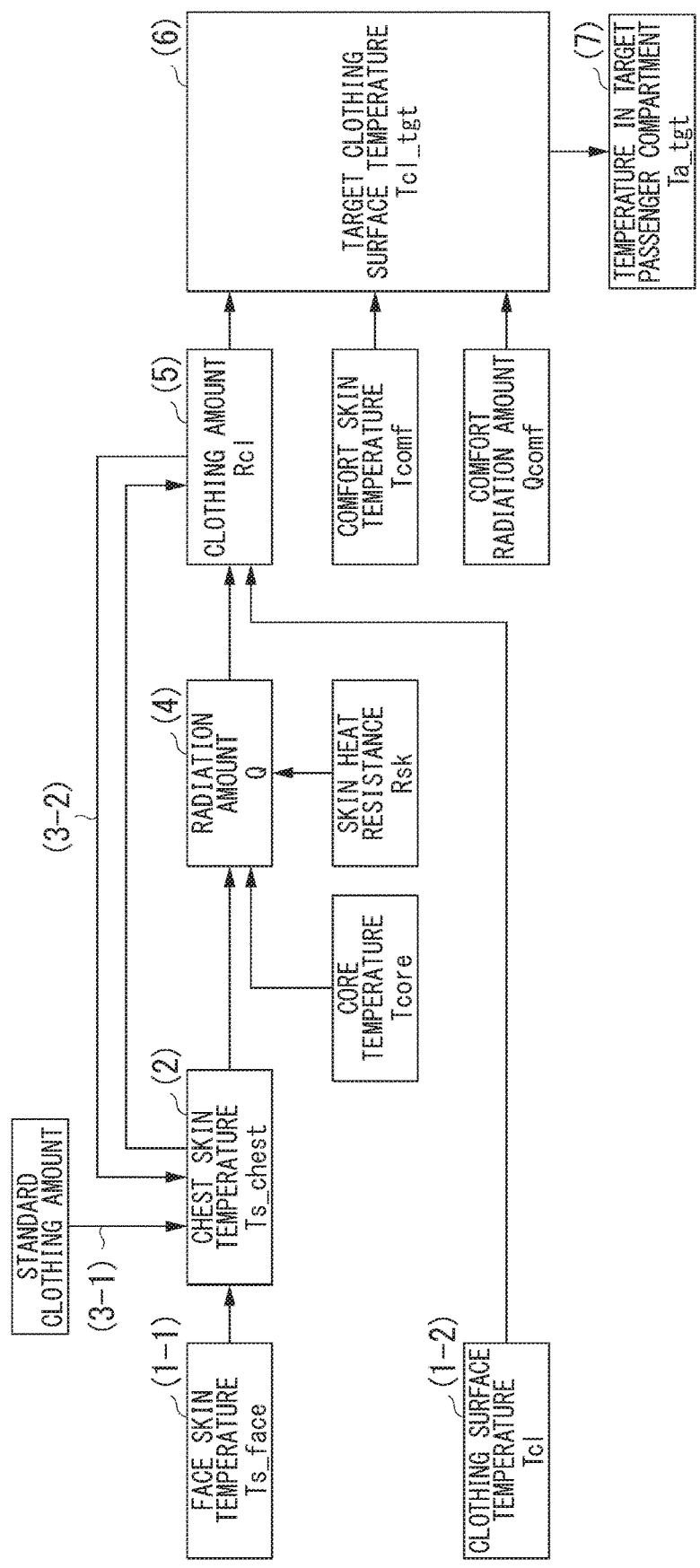
FIG. 3 is a view for describing input/output of detection results or estimation results of components in a case that a temperature in a target passenger compartment is set.

FIG. 3 is a view for describing detection results of components or input/output of estimation results in a case that the temperature in a target passenger compartment Ta_tgt is set. Various types of processing will be described in detail.

First, the analysis unit 120 analyzes the face skin temperature Ts_face and the clothing surface temperature Tcl (1-1) and (1-2). Next, the chest temperature estimator 130 estimates the chest skin temperature Ts_chest on the basis of the clothing amount Rcl and the face skin temperature Ts_face of the occupant (2). Here, a preset standard clothing amount may be used (3-1), or the value in a case that the clothing amount Rcl estimated during the previous processing (may be processing before one cycle or may be during last riding) is stored in the storage unit 180 (3-2) may be used. Next, the heat radiation amount estimator 140 estimates the heat radiation amount Q of the occupant on the basis of the chest skin temperature Ts_chest, the core temperature Tcore, and the skin heat resistance Rsk (4).

Next, the clothing amount estimator 160 estimates the clothing amount Rcl of the occupant on the basis of the chest skin temperature Ts_chest, the heat radiation amount Q, and the clothing surface temperature Tcl (5). Next, the control unit 170 sets the target clothing surface temperature Tcl_tgt on the basis of the clothing amount Rcl, the comfortable skin temperature Tcomf, and the comfortable radiation amount Qcomf (6). Next, the control unit 170 sets the temperature in a target passenger compartment Ta_tgt to make the clothing surface temperature Tcl become the target clothing surface temperature Tcl_tgt (7). The air-conditioning control device 100 can perform control such that the inside of the passenger compartment reaches a comfortable temperature for the occupant by controlling the air conditioning device 80 on the basis of the temperature in the target passenger compartment Ta_tgt obtained in this way.

[Face Skin Temperature]

For example, the analysis unit 120 derives the face of the occupant on the basis of the thermograph image acquired by the occupant sensor 76 and the template showing a shape of a human's body or trends in temperature distribution, and outputs the derived surface temperature of the skin to the chest temperature estimator 130.

The analysis unit 120 may correct the surface temperature of the exposed skin of the occupant obtained by analyzing the thermograph image on the basis of one or more parameters of the detection values of the outdoor temperature detected by the outdoor temperature sensor 70, the detection values of the indoor temperature detected by the indoor temperature sensor 72, and the sunshine amount detected by the sunshine sensor 74.

The analysis unit 120 may acquire a surface temperature of an exposed portion of the arms or legs of the occupant as a substitute in a case that the temperature of the face portion of the occupant cannot be detected. However, since the arms or legs have more heat production than the face portion and are also involved in adjustment of heat dissipation, it is desirable to use the temperature of the face portion.

[Clothing Surface Temperature]

For example, the analysis unit 120 derives an occupant clothing part (for example, in the vicinity of the abdomen or the chest) on the basis of the thermograph image acquired by the occupant sensor 76 and the template showing the tendency of the temperature distribution, and outputs the derived surface temperature of the clothing to the clothing amount estimator 160.

The analysis unit 120 may correct the surface temperature of the clothing of the occupant obtained by analyzing the thermograph image on the basis of one or more parameters of the detection values of the outdoor temperature detected by the outdoor temperature sensor 70, the detection values of the indoor temperature detected by the indoor temperature sensor 72, and the sunshine amount detected by the sunshine sensor 74.

[Estimation of Chest Skin Temperature]

Hereinafter, a method of estimating the chest skin temperature Ts_chest using the chest temperature estimator 130 will be described.

The chest temperature estimator 130 estimates the chest skin temperature Ts_chest by applying the face skin temperature Ts_face to the following Math. (1).

[Math. 1]

$$T_{s\_chest} = A T_{s\_face}^2 + B T_{s\_face} + C \quad (1)$$

Here, A, B and C are coefficients that are set according to the clothing amount Rcl.

[Summary of Clothing Amount]

Hereinafter, the clothing amount Rcl will be described. For example, the clothing amount Rcl is represented as a value of 0 to 1, 0 representing a state in which the skin of the occupant is exposed, and 1 shows a state in which the occupant is wearing clothing through which radiation from the skin cannot pass (heavy winter clothing that is completely insulating). For example, a level of the clothing amount estimated by the clothing amount estimator 160 may be defined in stages such as "thin clothing," "standard" and "thick clothing" or may be defined linearly. The clothing amount Rcl may be set on the basis of, for example, a do value (a clothing value). The do value is, for example, a parameter of a heat retaining property of clothing that is defined as 1 [clo] in a case that a person sitting quietly in a chair feels neither hot nor cold (comfortable) under an environment of an air temperature of 21 [° C.], a humidity of 50 [%], and an air flow of 0.1 [meter/sec].

[Standard Clothing Amount]

Figures 4, 5:
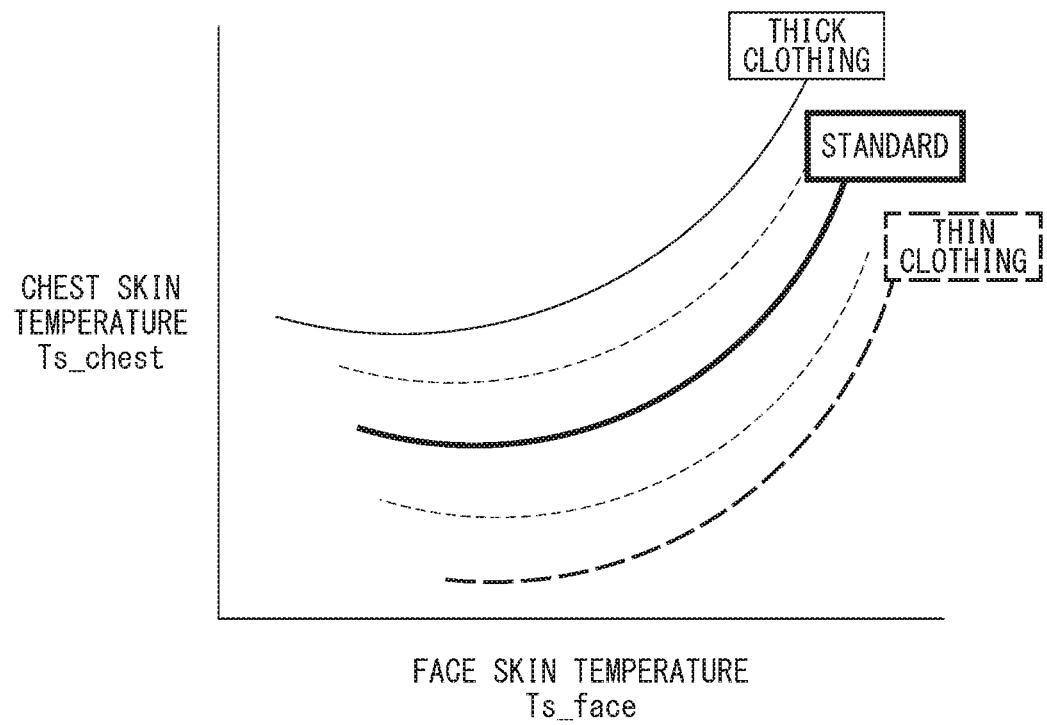
FIG. 4 is a view for describing a coefficient referred to during estimation of a chest skin temperature.
FIG. 5 is a graph showing trends in chest skin temperature.

FIG. 4 is a view for describing a coefficient referred to during estimation of the chest skin temperature Ts_chest by the chest temperature estimator 130.

The chest temperature estimator 130 assumes that a level of the clothing of the occupant is standard in a case that the clothing amount of the occupant is not estimated (for example, in a case that the occupant boards the vehicle 10 for the first time or in a case that the clothing amount estimated in the past is reset), and derives the estimated value of the chest skin temperature Ts_chest by applying A (a black circle sign), B (x sign) and C (a black triangle sign) that correspond to the clothing amount Rcl "standard" in FIG. 4 to Math. (1).

[Clothing Amount Stored in Storage Unit]

The chest temperature estimator 130 derives the estimated value of the chest skin temperature Ts_chest by applying the clothing amount Rcl to FIG. 4 in a case that the clothing amount Rcl of the occupant is already estimated in the processing described below. In a case that the clothing amount Rcl of the occupant is already estimated, the clothing amount may be the clothing amount Rcl estimated during processing before one routine, or may be a clothing amount estimated in a case that the occupant boarded last time. The clothing amount estimated during last boarding is a clothing amount estimated before several hours, or a clothing amount estimated in a case that the occupant has boarded in a state in which a power supply of the vehicle 10 is turned on before the power supply of the vehicle 10 is turned off last time. The clothing amount Rcl may be stored in, for example, the storage unit 180, may be referred to during the next boarding, or may be reset during getting-off of the occupant or boarding of the occupant. The clothing amount Rcl is not limited to three types of thin clothing, standard and thick clothing, and may be four types or more.

For example, the chest temperature estimator 130 derives the chest skin temperature Ts_chest by applying A (a circle sign), B (a plus sign) and C (a triangle sign) associated with "thin clothing" of a level of clothing in FIG. 4 to Math. (1) in a case that it is estimated that the level of the clothing by the clothing amount estimator 160 corresponds to "thin clothing." In this way, the chest temperature estimator 130 can increase estimation accuracy of the clothing amount Rcl and increase estimation accuracy of the chest skin temperature Ts_chest by repeating the same routine processing again using the estimated value in a case that the clothing amount Rcl is estimated by the clothing amount estimator 160.

FIG. 5 is a graph showing a tendency of the chest skin temperature Ts_chest. The chest temperature estimator 130 estimates that the chest skin temperature Ts_chest tends to become higher as the clothing amount Rcl increases even in a case that the face skin temperature Ts_face is the same as shown in FIG. 5 by applying the clothing amount Rcl and the face skin temperature Ts_face to the above-mentioned Math. (1).

[Estimation of Radiation Amount]

Hereinafter, a method of estimating a heat radiation amount using the heat radiation amount estimator 140 will be described.

Figure 6:
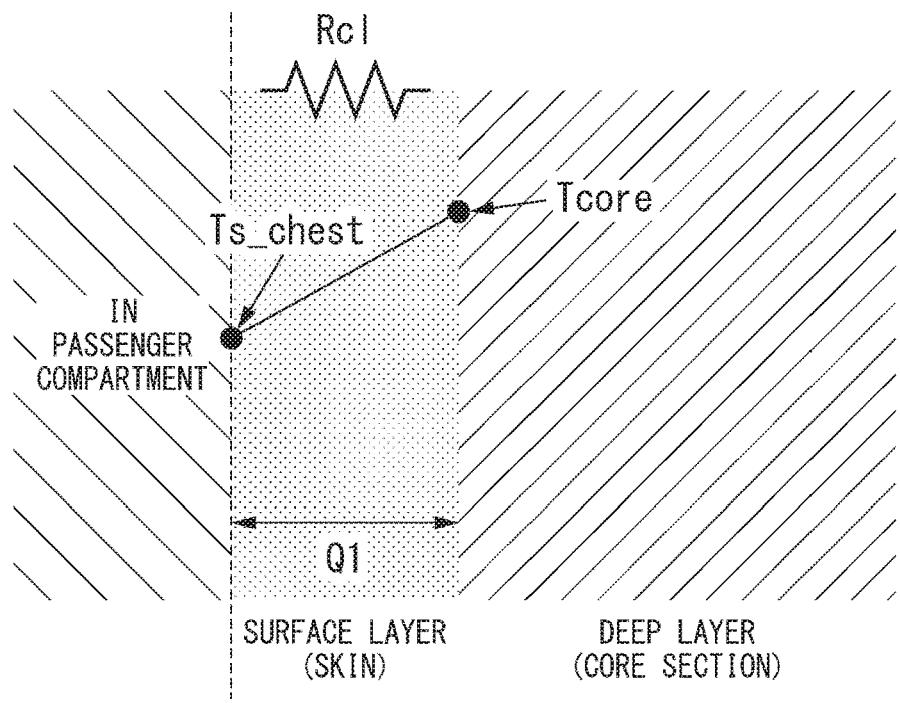
FIG. 6 is a view showing a heat balance model of a human body.

FIG. 6 is a view showing a heat balance model of a human body. As shown in FIG. 6, the heat radiation amount estimator 140 assumes that the human body has a two-layer structure of a surface layer (the skin) and a deep layer (a core section) and estimates a heat radiation amount (hereinafter, a heat radiation amount Q1) from the chest skin surface to the clothing surface of the occupant using the following Math. (2).

[Math. 2]

$$Q1 = \frac{T_{core} - T_{s\_chest}}{R_{sk}} \quad (2)$$

For example, the skin heat resistance Rsk may be a fixed value stored in the storage unit 180 in advance or stepwise values may be set according to ages or the like of the occupant. In the ages of the occupant, ages estimated by the analysis unit 120 may be reference or may be stored in the occupant temperature information 182 in advance.

[Estimation of Clothing Amount]

Hereinafter, a method of estimating the clothing amount Rcl using the clothing amount estimator 160 will be described.

Figure 7:
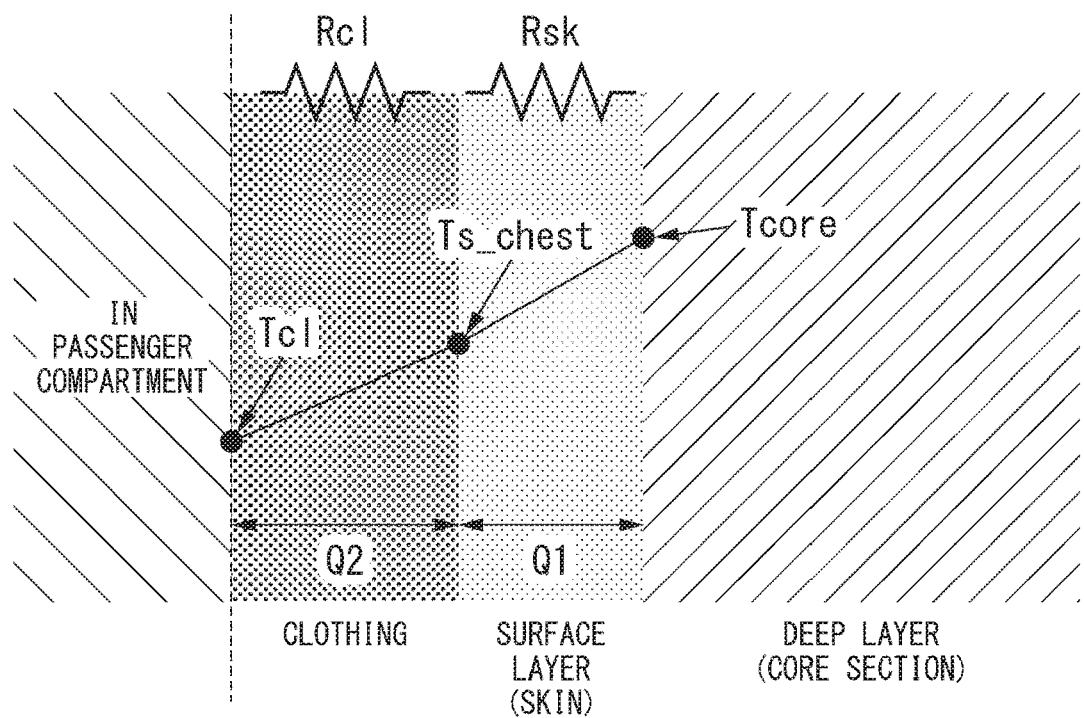
FIG. 7 is a view showing a heat balance model of an occupant.

FIG. 7 is a view showing a heat balance model of the occupant. FIG. 7 shows a clothing state in addition to the heat balance model shown in FIG. 6. As shown in FIG. 7, the clothing surface temperature Tcl represents a temperature of a clothing surface in contact with air in the passenger compartment.

The clothing amount estimator 160 estimates a heat radiation amount (hereinafter, a heat radiation amount Q2) from the chest skin of the occupant to the clothing surface. The radiation amount Q2 is estimated using the following Math. (3).

[Math. 3]

$$Q2 = \frac{T_{s\_chest} - T_{cl}}{R_{cl}} \quad (3)$$

The clothing amount estimator 160 estimates that the heat radiation amount Q1 from the core section to the chest skin surface of the occupant derived by Math. (2) and the heat radiation amount Q2 are equal to each other in a stable state, and estimates the clothing amount Rcl. In the following description, the heat radiation amount, which may be either the heat radiation amount Q1 or the heat radiation amount Q2, is referred to as the heat radiation amount Q. The clothing amount estimator 160 estimates the clothing amount Rcl using the following Math. (4) derived from Math. (2) and Math. (3). The estimated clothing amount Rcl is used in processing of deriving the chest skin temperature Ts_chest of the next time.

[Math. 4]

$$R_{cl} = \frac{T_{s\_chest} - T_{cl}}{Q} \quad (4)$$

[Setting of Target Clothing Surface Temperature]

Hereinafter, a method of setting the target clothing surface temperature Tcl_tgt using the control unit 170 will be described.

The control unit 170 sets the target clothing surface temperature Tcl_tgt at which the heat radiation amount Q1 becomes equal to the comfortable radiation amount Qcomf using the following Maths. (5) to (6) on the basis of the clothing amount Rcl estimated by the clothing amount estimator 160. Math. (6) is obtained by substituting the chest skin temperature Ts_chest of the above-mentioned Math. (4) with the comfortable skin temperature Tcomf. Math. (6) is an expansion of Math. (5) in a case that the clothing surface temperature Tcl is the target clothing surface temperature Tcl_tgt.

[Math. 5]

$$R_{cl} = \frac{T_{comf} - T_{cl}}{Q_{comf}} \quad (5)$$

$$T_{cl\_tgt} = T_{comf} - Q_{comf} * R_{cl} \quad (6)$$

The comfortable radiation amount Qcomf is estimated using Math. (7) obtained by substituting the chest skin temperature Ts_chest of the above-mentioned Math. (2) with the comfortable skin temperature Tcomf.

[Math. 6]

$$Q_{comf} = \frac{T_{core} - T_{comf}}{R_{sk}} \quad (7)$$

The comfortable radiation amount Qcomf or the comfortable skin temperature Tcomf may be corrected on the basis of a compensation value set according to the occupant stored in the storage unit 180. In this case, the comfortable radiation amount Qcomf or the comfortable skin temperature Tcomf is corrected to match with preference of the air-conditioning settings of the occupant using the compensation value set by the occupant.

[Setting of Temperature in a Target Passenger Compartment]

Hereinafter, a method of setting the temperature in a target passenger compartment Ta_tgt using the control unit 170 will be described. The control unit 170 detects the temperature in the passenger compartment near the occupant to match (or approach) the clothing surface temperature Tcl with the set target clothing surface temperature Tcl_tgt. Then, the control unit 170 sets the temperature in a target passenger compartment Ta_tgt that is a set temperature used in controlling the air conditioning device 80.

The control unit 170 may correct a set temperature by adding preference of the air-conditioning settings of the occupant stored in the occupant temperature information 182 in advance, and may set an air volume and an air direction of air conditioning in addition to the set temperature.

For example, the control unit 170 derives the comfortable radiation amount Qcomf on the basis of a convection radiation amount or a radiation heat dissipation (for example, estimated from the clothing surface temperature Tcl) in the passenger compartment. The control unit 170 derives a solar element Qsun on the basis of a clothing color solar absorptance of the occupant, a clothing color solar transmittance, a solar transmission amount QST of the windshield of the vehicle 10, or the like. For example, the control unit 170 derives the temperature in a target passenger compartment Ta_tgt in consideration of a temperature and a stay heat conductivity of a member. The control unit 170 sets the temperature in a target passenger compartment Ta_tgt on the basis of these derived results.

[Processing Flow]

Figure 8:
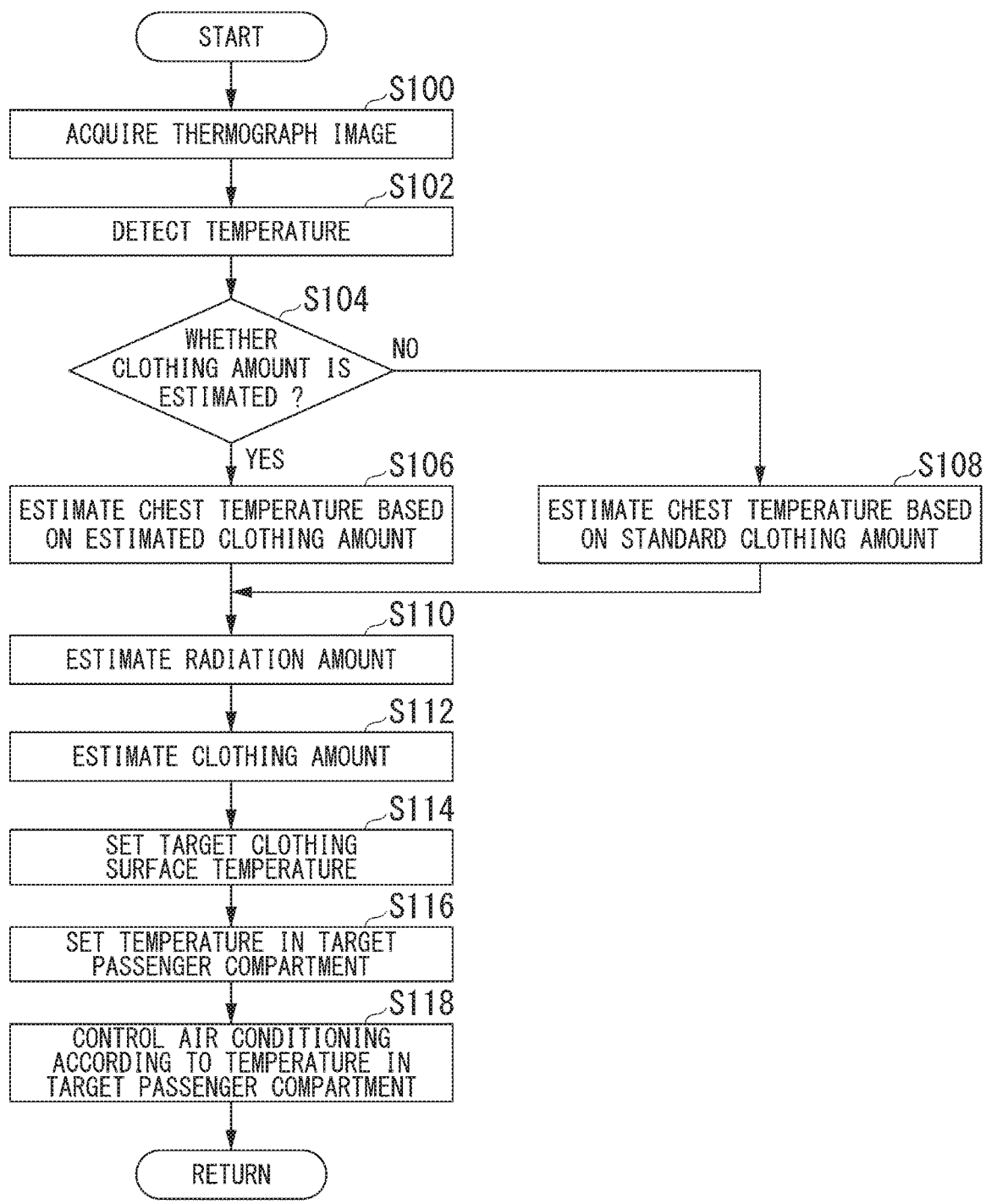
FIG. 8 is a flowchart showing an example of a flow of control processing by an air-conditioning control device.

FIG. 8 is a flowchart showing an example of a flow of control processing using the air-conditioning control device 100. For example, processing in the flowchart may be repeatedly performed at a predetermined period.

First, the receiving unit 110 receives a thermograph image including an occupant (step S100). Next, the analysis unit 120 detects the face skin temperature Ts_face and the clothing surface temperature Tcl of the occupant (step S102). Next, the chest temperature estimator 130 determines whether the clothing amount Rcl of the occupant is already estimated (step S104). The chest temperature estimator 130 estimates the chest skin temperature Ts_chest on the basis of the clothing amount Rcl and the face skin temperature Ts_face in a case that the clothing amount Rcl is already estimated (step S106). The chest temperature estimator 130 estimates the chest skin temperature Ts_chest on the basis of the standard clothing amount and the face skin temperature Ts_face in a case that the clothing amount Rcl is not estimated (step S108).

After processing of step S106 or step S108, the heat radiation amount estimator 140 estimates the heat radiation amount Q of the occupant (step S110). Next, the clothing amount estimator 160 estimates the clothing amount Rcl of the occupant (step S112). Next, the control unit 170 sets the target clothing surface temperature Tcl_tgt (step S114), and sets the temperature in a target passenger compartment Ta_tgt (step S116). Next, the control unit 170 outputs a control order to the air conditioning device 80 such that a temperature in the vicinity of the occupant in the passenger compartment becomes the temperature in a target passenger compartment Ta_tgt (step S118). Hereinabove, description of the processing of the flowchart is terminated.

The air-conditioning control device 100 can control the air conditioning device 80 to become the comfortable temperature in the passenger compartment according to the occupant by estimating the chest skin temperature Ts_chest on the basis of the face skin temperature Ts_face as described above, estimating the clothing amount Rcl on the basis of the chest skin temperature Ts_chest and the heat radiation amount Q estimated at the next time, and setting the target clothing surface temperature Tcl_tgt according to the clothing amount Rcl estimated at the next time. The air-conditioning control device 100 can realize a state in which the vehicle 10 has moderate air conditioning inside the passenger compartment and can minimize energy loss due to excessive air conditioning by controlling the air conditioning device 80 to become the temperature in a target passenger compartment Ta_tgt according to the target clothing surface temperature Tcl_tgt.

[Variant]

An air-conditioning control device of a variant corrects the target clothing surface temperature that becomes a standard such that a difference between the target clothing surface temperature and the clothing surface temperature is less than a threshold value or information for deriving the target clothing surface temperature in a case that a difference between the target clothing surface temperature and the clothing surface temperature is equal to or larger than the threshold value. Hereinafter, the variant will be described.

Figure 9:
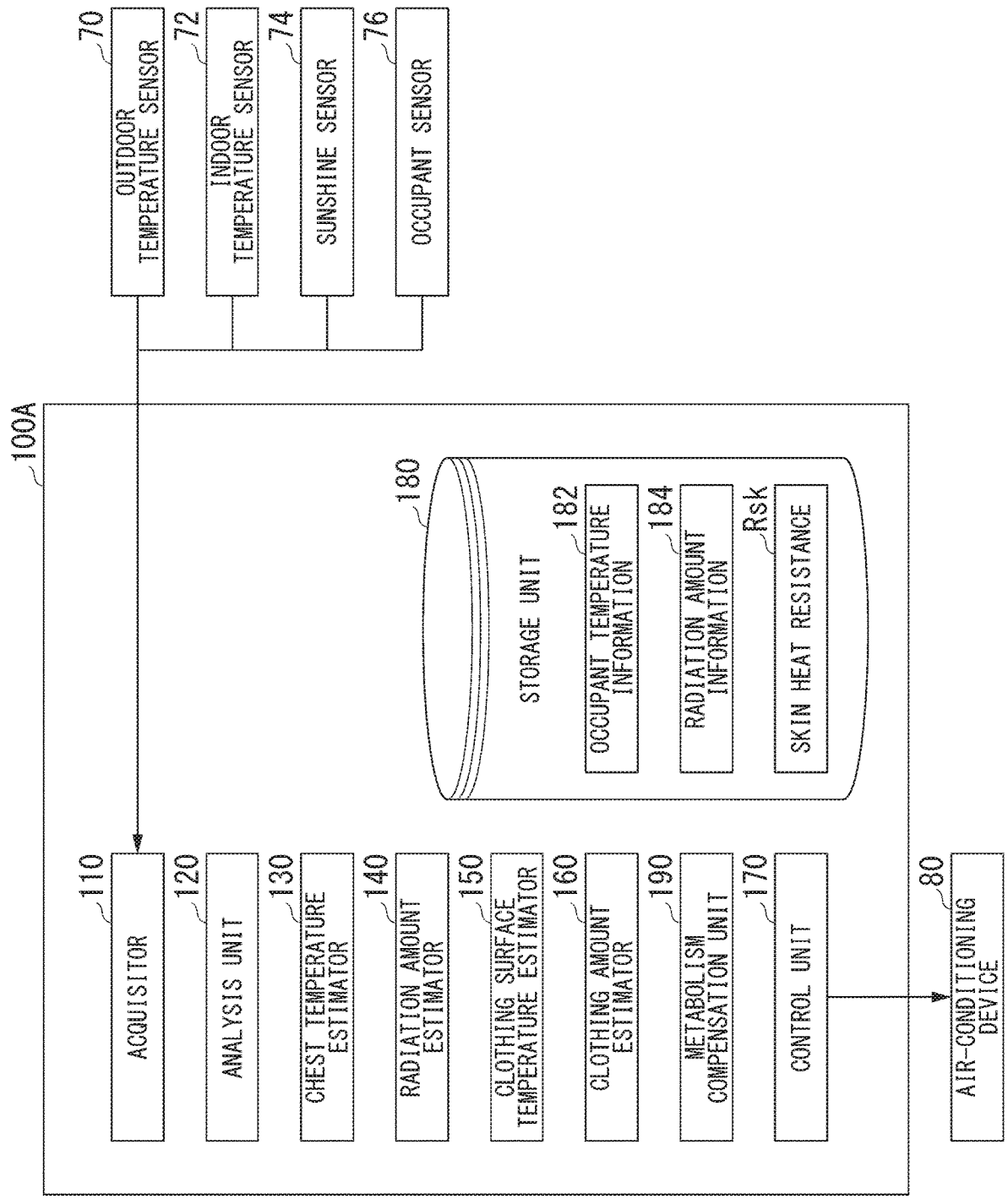
FIG. 9 is a view showing an example of a configuration of an air-conditioning control device of a variant.

FIG. 9 is a view showing an example of a configuration of an air-conditioning control device 100A of the variant. The air-conditioning control device 100A of the variant further includes a correction unit 190 in addition to the air-conditioning control device 100.

The correction unit 190 corrects the temperature on the basis of the information for deriving the temperature in a target passenger compartment Ta_tgt or the target clothing surface temperature Tcl_tgt such that a difference between the clothing surface temperature Tcl and the target clothing surface temperature Tcl_tgt is reduced in a case that a temperature difference between the clothing surface temperature Tcl and the target clothing surface temperature Tcl_tgt analyzed by the analysis unit 120 is equal to or larger than the threshold value. The information for deriving the target clothing surface temperature Tcl_tgt is, for example, some or all of the core temperature Tcore, the skin heat resistance Rsk, the heat radiation amount Q and the clothing amount Rcl. A compensation value corrected by the correction unit 190 may be a fixed value, or may be derived according to a compensation value table, map, or the like, associated with the temperature difference and set in advance. The correction unit 190 performs setting of the temperature in a target passenger compartment Ta_tgt to the control unit 170 on the basis of the target clothing surface temperature Tcl_tgt to which the compensation value is reflected or the information for deriving the target clothing surface temperature Tcl_tgt. Compensation of the face skin temperature Ts_face, the chest skin temperature Ts_chest, or information for deriving these temperatures may be performed instead of (or in addition to) the compensation of the information.

[Processing Flow]

Figure 10:
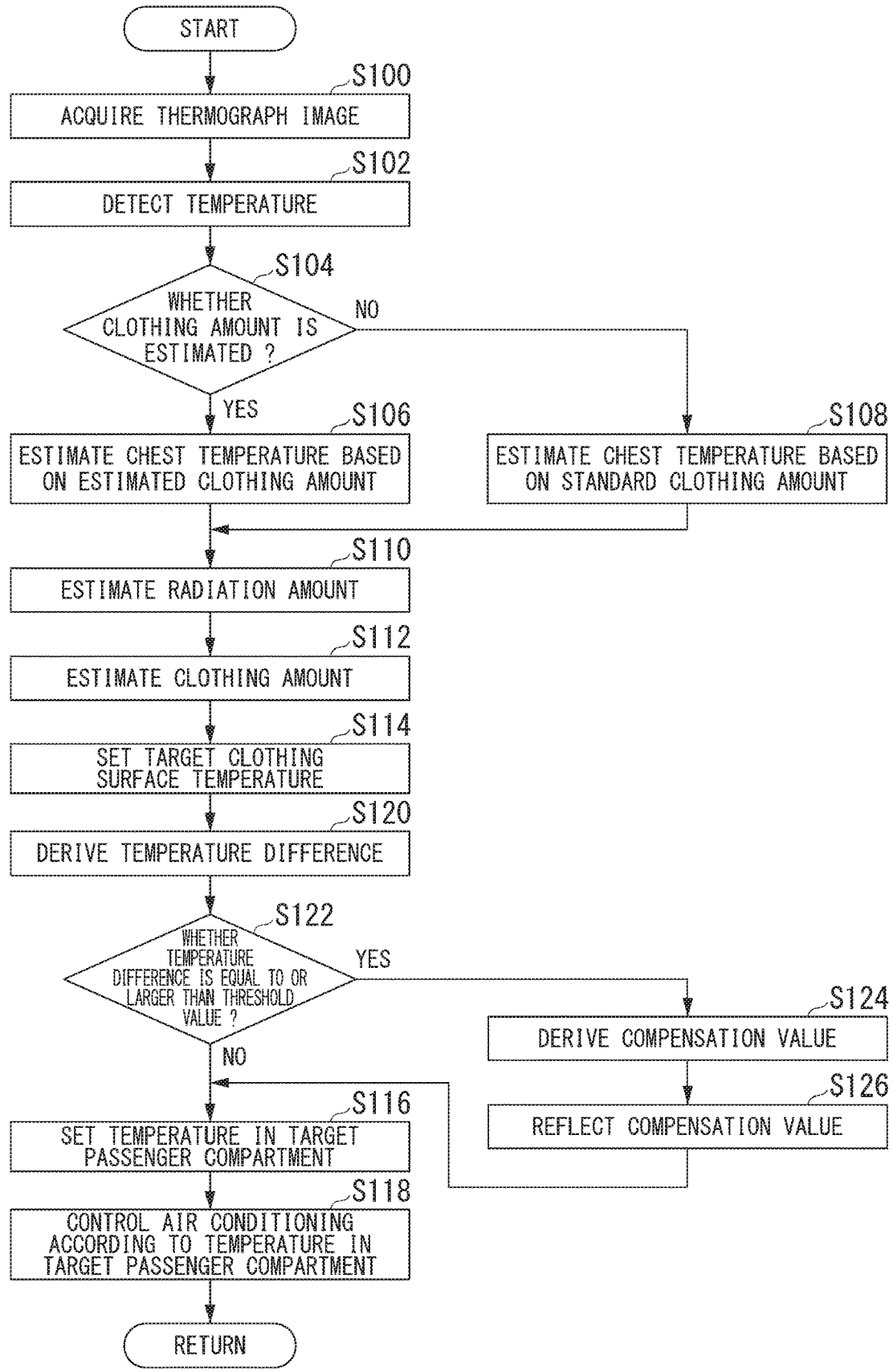
FIG. 10 is a flowchart showing an example of a flow of processing of the air-conditioning control device.

FIG. 10 is a flowchart showing an example of a flow of processing of the air-conditioning control device 100A. The flowchart of FIG. 10 is obtained by adding steps S120 to S126 to the flowchart shown in FIG. 8. Accordingly, hereinafter, steps S120 to S126 will be described.

After processing of step S110, the correction unit 190 derives a temperature difference between the clothing surface temperature Tcl analyzed by the analysis unit 120 and the target clothing surface temperature Tcl_tgt (step S120), and determines whether the temperature difference is equal to or larger than the threshold value (step S122). The correction unit 190 derives a compensation value in a case that it is determined that the temperature difference is equal to or larger than the threshold value (step S124), reflects the compensation value to the target clothing surface temperature Tcl_tgt or information for deriving the target clothing surface temperature Tcl_tgt (step S126), and advances the processing to step S116. The correction unit 190 advances the processing to step S116 in a case that it is determined that the temperature difference is less than the threshold value. Hereinabove, description of the processing of the flowchart is terminated.

[Hardware Configuration]

Figure 11:
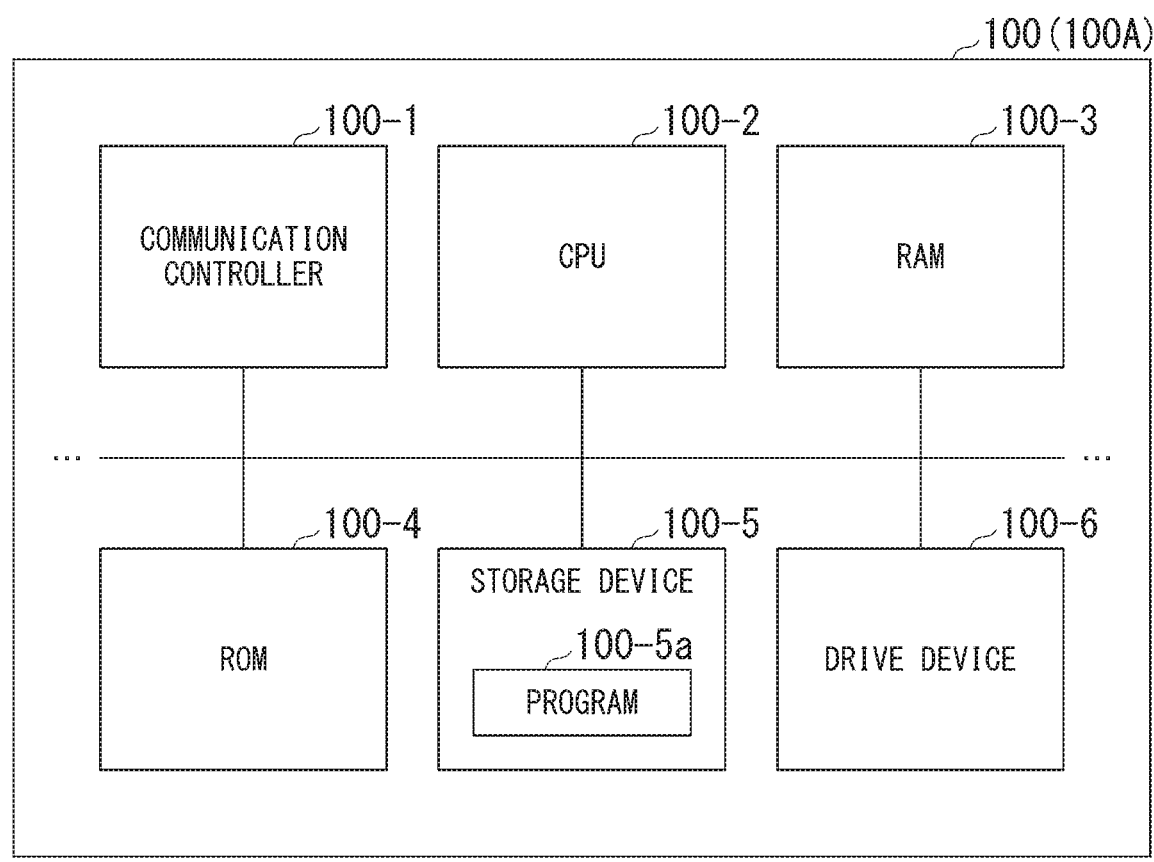
FIG. 11 is a view showing an example of a hardware configuration of respective parts of the air-conditioning control device of the embodiment.

The air-conditioning control device 100 and the air-conditioning control device 100A of the vehicle 10 of the above-mentioned embodiment is realized by, for example, the configuration of the hardware shown in FIG. 11. FIG. 11 is a view showing an example of the hardware configuration of the parts of the air-conditioning control device 100 and the air-conditioning control device 100A of the embodiment.

The air-conditioning control device 100 and the air-conditioning control device 100A have a configuration in which a communication controller 100-1, a CPU 100-2, a RAM 100-3, a ROM 100-4, a secondary storage device 100-5 such as a flash memory, a HDD, or the like, and a drive device 100-6, are connected to each other by an internal bus or a dedicated communication line. A portable recording medium such as an optical disk or the like is mounted on the drive device 100-6. A program 100-5a stored in the secondary storage device 100-5 is deployed on the RAM 100-3 by a DMA controller (not shown) or the like, and the air-conditioning control device 100 is realized by executing the program using the CPU 100-2. The program referred to by the CPU 100-2 may be stored in the portable recording medium mounted in the drive device 100-6 or may be downloaded from another device via a network NW.

According to the above-mentioned embodiment, the air conditioning device 80 can be controlled to become a comfortable temperature in the passenger compartment according to the occupant by including the analysis unit 120 configured to analyze the thermograph image acquired by the receiving unit 110 and output from the occupant sensor 76 and acquire the face skin temperature Ts_face of the occupant and the clothing surface temperature Tcl of the occupant, the chest temperature estimator 130 configured to estimate the chest skin temperature Ts_chest of the occupant on the basis of the face skin temperature Ts_face and the clothing amount Rcl, the clothing amount estimator 160 configured to estimate the clothing amount Rcl of the occupant on the basis of the chest skin temperature Ts_chest and the clothing surface temperature Tcl, and the control unit 170 configured to control the air conditioning device 80 of the vehicle 10 in which the occupant gets on the basis of the estimation result of the clothing amount estimator 160.

The chest temperature estimator 130 can increase estimation accuracy of the clothing amount Rcl by performing processing of estimation of the chest skin temperature Ts_chest on the basis of a standard clothing amount that is previously set in processing of the first routine, and estimation of the chest skin temperature Ts_chest on the basis of the clothing amount Rcl estimated by the clothing amount estimator 160 in processing of the first routine.

Hereinabove, while modes for embodying the present invention have been described with reference to the embodiments, the present invention is not limited to the embodiments, and various modifications and substitutions may be made without departing from the spirit of the present invention.

What is claimed is:

1. An air-conditioning control system for a vehicle comprising:
    an acquisitor configured to acquire an exposure temperature of an exposed body surface of an occupant and a clothing surface temperature of the occupant;
    a non-exposure temperature estimator configured to estimate a non-exposure temperature of a non-exposed body surface of the occupant on the basis of the exposure temperature and a clothing amount;
    a clothing amount estimator configured to estimate the clothing amount on the basis of the non-exposure temperature and the clothing surface temperature; and
    a control unit configured to control an air conditioner of a vehicle into which the occupant gets on the basis of an estimation result of the clothing amount estimator.

2. The air-conditioning control system for a vehicle according to claim 1, wherein the non-exposure temperature estimator estimates the non-exposure temperature on the basis of the clothing amount estimated by the clothing amount estimator.

3. The air-conditioning control system for a vehicle according to claim 2, wherein the non-exposure temperature estimator estimates the non-exposure temperature on the basis of the clothing amount, which is previously set, in processing of a first routine, and
    estimates the non-exposure temperature on the basis of the clothing amount estimated by the clothing amount estimator after processing of the first routine, and
    the clothing amount estimator estimates a clothing amount of the occupant on the basis of a non-exposure temperature estimated by the non-exposure temperature estimator and the clothing surface temperature.

4. The air-conditioning control system for a vehicle according to claim 1, comprising a heat radiation amount estimator configured to estimate a heat radiation amount of the occupant on the basis of the non-exposure temperature, a core temperature of the occupant, and a skin heat resistance,
    wherein the clothing amount estimator estimates the clothing amount on the basis of the heat radiation amount estimated by the heat radiation amount estimator, the non-exposure temperature, and the clothing surface temperature.

5. The air-conditioning control system for a vehicle according to claim 1, wherein the control unit sets a target clothing surface temperature, which is a target, on the basis of the clothing amount estimated by the clothing amount estimator, and sets a temperature in a target passenger compartment and controls the air conditioner such that the clothing surface temperature approaches the target clothing surface temperature that is set.

6. The air-conditioning control system for a vehicle according to claim 5, further comprising a correction unit configured to correct the target clothing surface temperature or information for deriving the target clothing surface temperature on the basis of a temperature difference between the target clothing surface temperature and the clothing surface temperature in a case that the temperature difference is equal to or larger than a threshold value.

7. An air-conditioning control method for a vehicle, performed by a computer and comprising:
- acquiring an exposure temperature of an exposed body surface of an occupant and a clothing surface temperature of the occupant;
- estimating a non-exposure temperature of a non-exposed body surface of the occupant on the basis of the exposure temperature and a clothing amount;
- estimating the clothing amount on the basis of the non-exposure temperature and the clothing surface temperature; and
- controlling an air conditioner of a vehicle into which the occupant gets on the basis of an estimation result of the clothing amount.

8. A non-transitory computer-readable recording medium recording a vehicle control program causing an in-vehicle computer to:
- acquire an exposure temperature of an exposed body surface of an occupant and a clothing surface temperature of the occupant;
- estimate a non-exposure temperature of a non-exposed body surface of the occupant on the basis of the exposure temperature and a clothing amount;
- estimate the clothing amount on the basis of the non-exposure temperature and the clothing surface temperature; and
- control an air conditioner of a vehicle into which the occupant gets on the basis of an estimation result of the clothing amount.

* * * * *